(12) United States Patent
Balasubramanian et al.

(10) Patent No.: US 9,690,687 B2
(45) Date of Patent: Jun. 27, 2017

(54) DYNAMIC ALLOCATION OF TRACE ARRAY TIMESTAMP DATA

(71) Applicant: International Business Machines Corporation, Armonk, NY (US)

(72) Inventors: Santosh Balasubramanian, Bangalore (IN); Pradeep N. Chatnahalli, Shimoga (IN); Rajeev Potharlanka, Ramagundam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/108,470

(22) Filed: Dec. 17, 2013

(65) Prior Publication Data

US 2015/0169429 A1 Jun. 18, 2015

(51) Int. Cl.
*G06F 9/44* (2006.01)
*G06F 11/36* (2006.01)
*G06F 11/34* (2006.01)

(52) U.S. Cl.
CPC ...... *G06F 11/3636* (2013.01); *G06F 11/3476* (2013.01); *G06F 2201/835* (2013.01); *G06F 2201/865* (2013.01)

(58) Field of Classification Search
CPC ............ G06F 11/3636; G06F 11/3466; G06F 11/3476; G06F 2201/835; G06F 2201/865
USPC .......................................... 717/128, 130, 131
See application file for complete search history.

(56) References Cited

U.S. PATENT DOCUMENTS

| | | | |
|---|---|---|---|
| 6,802,031 B2 * | 10/2004 | Floyd et al. | 714/45 |
| 7,346,476 B2 * | 3/2008 | Levine et al. | 702/187 |
| 2006/0184832 A1 * | 8/2006 | Floyd et al. | 714/45 |
| 2011/0219376 A1 | 9/2011 | Williams et al. | |

OTHER PUBLICATIONS

IBM, "Connpresssed Trace Compression Timestamp", An IP.com Prior Art Database Technical Disclosure, Jan. 26, 2010, IPCOM000192640D, <http://ip.com/IPCOM/000192640>.

* cited by examiner

*Primary Examiner* — Anna Deng
(74) *Attorney, Agent, or Firm* — Khyle J. Eaton (57) ABSTRACT

A processor determines a timestamp for a signal based on a number of consecutive cycles that the signal is present on a trace bus. The processor writes a first part of the timestamp to a memory that is allocated for a timestamp of a trace entry. The processor overwrites one or more identified free bits with a second part of the timestamp of the trace entry.

18 Claims, 5 Drawing Sheets

DYNAMIC ALLOCATION OF TRACE ARRAY TIMESTAMP DATA

BACKGROUND OF THE INVENTION

The present disclosure relates generally to the field of software monitoring, and more particularly to the storage of trace data.

A trace monitors variable access, command usages and command execution. An array, in computer science, is generally a collection of data items that can be selected by indices computed at run time. In software engineering, tracing is a specialized use of logging to record information about a program's execution. This information is typically used by programmers for debugging purposes, and additionally, depending on the type and detail of information contained in a trace log, by experienced system administrators or technical support personnel and software monitoring tools to diagnose common problems with software. Because software tracing is low-level, the possible volume of trace messages can be very large.

SUMMARY

Embodiments of the present disclosure disclose a method, computer program product, and logic device for dynamically allocating trace array timestamp data to increase efficiency. A processor determines a timestamp for a signal based on a number of consecutive cycles that the signal is present on a trace bus. The processor writes a first part of the timestamp to a memory that is allocated for a timestamp of a trace entry. The processor overwrites one or more identified free bits with a second part of the timestamp of the trace entry.

DETAILED DESCRIPTION

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java®, Smalltalk®, C++ or the like and conventional procedural programming languages, such as the "C" programming language or similar programming languages (note: the term(s) "Java", "Smalltalk" and the like may be subject to trademark rights in various jurisdictions throughout the world and are used here only in reference to the products or services properly denominated by the marks to the extent that such trademark rights may exist). The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

In an exemplary embodiment of the present disclosure, the method of increasing the efficiency of a trace array is implemented using software. Other embodiments may include hardware such as electronic circuits, integrated circuits, and other like components that are combined to form logic device(s) to carry out the method described in FIG. 2.

Figure 1:
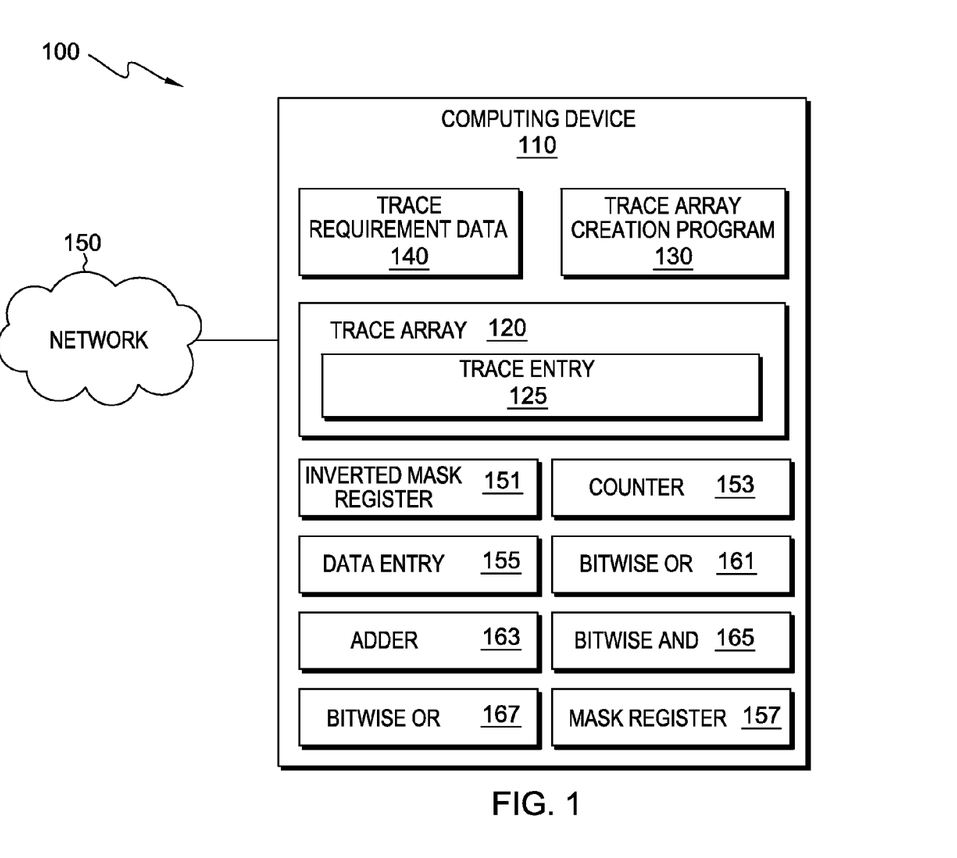
FIG. 1 is a functional block diagram illustrating a computing environment, in accordance with an embodiment of the present disclosure.

The present disclosure will now be described in detail with respect to the figures. FIG. 1 is a functional block diagram illustrating a computing environment, generally designated 100, in accordance with one embodiment of the present disclosure. Computing environment 100 contains computing device 110, trace array 120, trace entry 125, trace array creation program 130, trace requirement data 140, network 150, inverted mask register 151, counter 153, data entry 155, bitwise OR 161, adder 163, bitwise AND 165, bitwise OR 167, and mask register 157.

In various embodiments of the present disclosure, computing device 110 can be a standalone device, a server, a laptop computer, tablet computer, netbook computer, personal computer (PC), or desktop computer. In another embodiment computing device 110 represents a computing system utilizing clustered computers and components to act as a single pool of seamless resources. In general, computing device 110 can be any computing device or combination of devices with access to network 150, and that include trace array 120, trace entry 125, trace array creation program 130, trace requirement data 140, inverted mask register 151, counter 153, data entry 155, bitwise OR 161, adder 163, bitwise AND 165, bitwise OR 167, and mask register 157, and that are capable of executing trace array creation program 130.

In various embodiments of the present disclosure, trace array 120 is an array of trace entries such as trace entry 125. Each trace entry contains data related to a specific signal present on a trace bus, and includes a timestamp indicating the number of consecutive cycles that the signal was present on the trace bus. Trace array 120 may contain any number of trace entries, and may include multiple entries which correspond to the same signal, variable, or parameter.

Trace array creation program 130 is a software program that utilizes trace requirement data 140 to facilitate the creation and optimization of trace entries such as trace entry 125 for storage in trace array 120.

In an exemplary embodiment of the present disclosure, trace requirement data 140 comprises data describing which specific signals are to be captured by a trace entry such as trace entry 125. In other embodiments trace requirement data 140 includes data related to which specific signals are not to be included in a trace entry such as trace entry 125. In an exemplary embodiment of the present disclosure, trace requirement data 140 is input into computing device 110 by a user, however in other embodiments trace requirement data 140 is received by computing device 110 from network 150, or provided through the operation of hardware or another program.

Network 150 can be, for example, a local area network (LAN), a wide area network (WAN) such as the internet, or a combination of the two, and may include wired, wireless, fiber optic or any other connection known in the art. In general, network 150 can be any combination of connections and protocols that will support communications between computing device 110 and any other devices which may be connected to network 150 and are capable of communicating with computing device 110.

Inverted mask register 151 is an inverted version of a mask register such as mask register 157. If mask register 157 contains a zero for a given bit of data, then the corresponding bit of data in inverted mask register 151 will contain a one.

Counter 153 is a memory which facilitates the storage of a numeric value such as a count. In this exemplary embodiment, counter 153 is used to store a the overflowing portion of a value corresponding to the number of consecutive cycles that a given signal has been present on a trace bus.

Data entry 155 is a portion of a trace entry which contains trace data. Data entry 155 is partially overwritten with overflowing timestamp data as a result of the process described in FIG. 2.

Bitwise OR 161 and bitwise OR 167 are logical operators which take two arrays of bits as inputs and produce a single array of bits as an output. The value of each bit in the output array is determined based on the values of the two corresponding bits in the input arrays. If both of the corresponding input bits have a value of zero, then the output bit will have a value of zero. However, if either or both of the input bits have a value of one, then the output bit will have a value of one.

Adder 163 is a mathematical adder which takes two or more values as an input and returns the sum of all its input values as an output.

Bitwise AND 165 is a logical operator which takes two arrays of bits as inputs and produces a single array of bits as an output. The value of each bit in the output array is determined based on the values of the two corresponding bits in the input arrays. If both of the corresponding input bits have a value of one, then the output bit will have a value of one. However, if either or both of the input bits have a value of zero, then the output bit will have a value of zero.

Mask register 157 is a mask register composed of an array of binary values. Mask register 157 is used to identify each bit of data in a corresponding data set as either a free bit or a piece of useful data. If a given bit in mask register 157 has a value of one, then the corresponding bit in the data set is a free bit while if a given bit in mask register 157 has a value of zero, then the corresponding bit in the data set is a piece of useful data.

Figure 2:
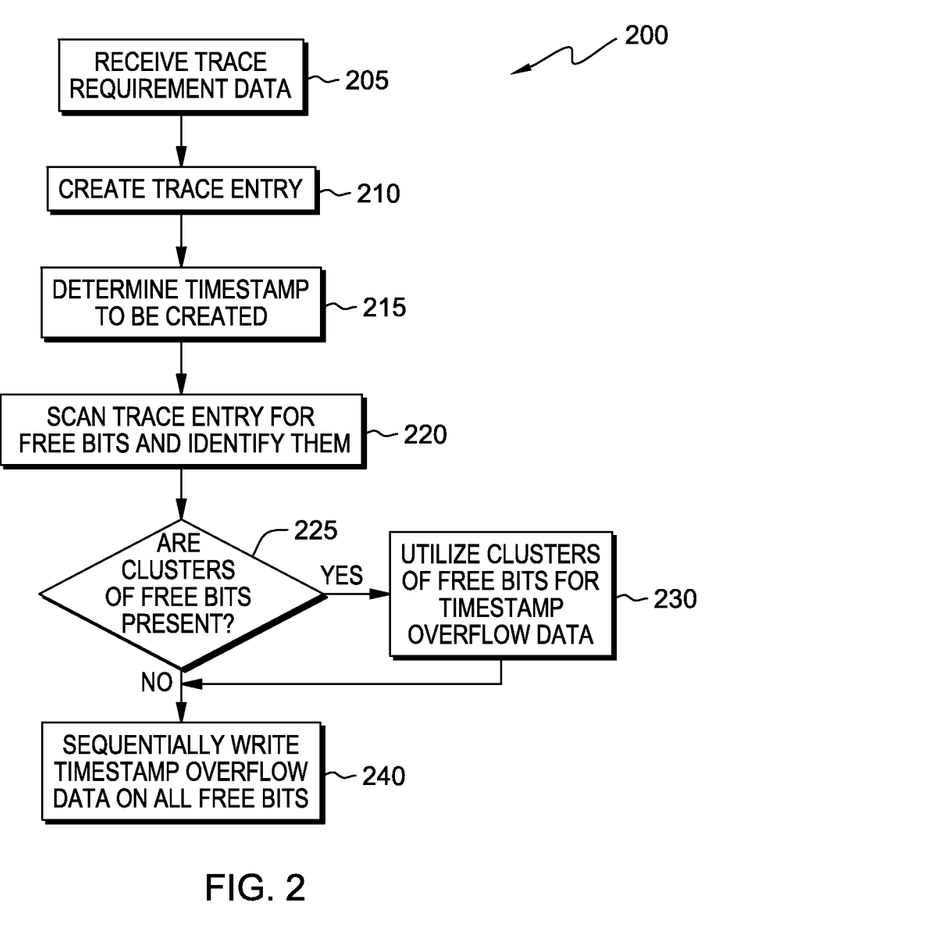
FIG. 2 is a flowchart depicting operational steps of a trace array creation program, on a computer within the computing environment of FIG. 1, in accordance with an embodiment of the present disclosure.

FIG. 2 is a flowchart detailing the operational steps of trace array creation program 130, generally designated 200, in accordance with one embodiment of the present disclosure.

In an exemplary embodiment of the present disclosure, computing device 110 receives trace requirement data 140, in step 205. Trace requirement data 140 can be input by a user of computing device 110, or received from a network such as network 150, or provided through the operation of hardware or another program. Trace requirement data 140 contains trace requirement parameters which describe specific signals which are important to the user, as well as signals which are unimportant to the user.

Trace entry 125 is created in step 210. Trace entry 125 is a record of a specific signal present at a location on the trace bus. A trace entry such as trace entry 125 contains both trace data as well as a timestamp. Trace data includes information related to a specific signal which trace entry 125 is used to capture, such as the usage or access of a variable, or the usage or execution of a command.

A timestamp within a trace entry represent the number of consecutive cycles for which a signal is present on the trace bus. Once a signal is no longer present, the number of consecutive cycles for which that signal was present is recorded in the form of a timestamp. A timestamp to be created for a trace entry is determined in step 215.

Once the trace entry is created and the timestamp is determined, the trace entry is examined in order to identify free bits, in step 220. Free bits comprise pieces of information which are either not specified as important in trace requirement data 140, or specified as unimportant in trace requirement data 140.

Computing device 110 searches for clusters of consecutive data identified as free bits in decision step 225. Clusters of consecutive free bits can be used to store large pieces of timestamp overflow data. Clusters can be any group of two or more consecutive bits of data which have been identified as free bits. If clusters of free bits are present (decision step 225, yes branch), then computing device 110 utilizes clusters of free bits for timestamp overflow data in step 230. If clusters of free bits are not present, (decision step 225, no branch) then computing device 110 sequentially writes timestamp overflow data onto all free bits which have been identified in step 240. If a portion of the timestamp overflow data remains, once all of the clusters of free bits have been used in step 230 to hold timestamp overflow data, then the remaining timestamp overflow data will be written sequentially on any remaining free bits as needed, in step 240.

Figure 3:
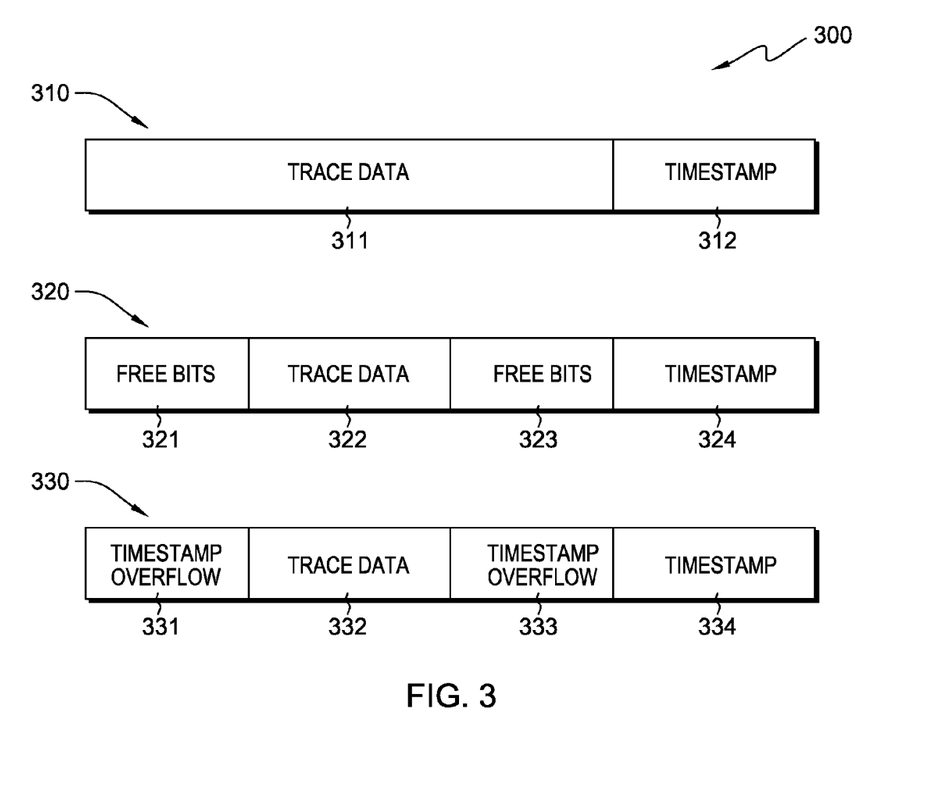
FIG. 3 is a functional block diagram illustrating the various stages of a trace entry during the various stages of the trace array creation program, in accordance with an embodiment of the present disclosure.

FIG. 3 shows an exemplary trace entry such as trace entry 125 during various steps of the execution of trace array creation program 130, generally designated 300.

Trace entry 310 shows an exemplary trace entry such as one created during step 210 of trace array creation program 130. In this state, trace entry 310 includes trace data 311 describing a specific signal or attribute to be recorded and analyzed based on the final trace entry. In this exemplary embodiment, trace entry 310 contains timestamp 312 allocated at the end of trace entry 310. In other embodiments timestamp 312 may be space allocated at the end of trace entry 310 to facilitate the creation of a timestamp at a later time.

Trace entry 320 shows a trace entry as it would be present after step 220 of trace array creation program 130. In this state, free bits 321 and 323 have been identified within trace data 311, yielding trace data 322, and are marked to be overwritten later to provide space for timestamp overflow data, assuming the timestamp data exceeds the size limit of timestamp 324. Free bits comprise information corresponding to a signal which was not specified as a signal of interest in trace requirement data 140.

Trace entry 330 shows a trace entry as it would be present after the termination of trace array creation program 130. Trace entry 330 includes timestamp overflow 331, trace data 332, timestamp overflow 333 and timestamp 334. In this state, free bits 321 and 323 have been overwritten with any timestamp overflow data which could not fit in timestamp 334. As described in greater detail with respect to FIG. 2, timestamp overflow data is overwritten first onto any present clusters of free bits, such as free bits 321 or 323, and then written sequentially onto any remaining free bits. This exemplary embodiment includes two large chunks of free bits within the trace data; however other embodiments can include any number of chunks of free bits, as well as any amount of free bits mixed in with the trace data within trace entry 330.

FIGS. 4, 5, 6, and 7 illustrate the logic associated with overwriting free bits with timestamp overflow data, in accordance with the process illustrated in FIG. 3. As free bits are overwritten, overflowing timestamp data will be written between segments of trace data. However, when timestamp overflow data is extracted and read sequentially it will contain the second portion of timestamp data corresponding to the overflowing timestamp value.

Figure 4:
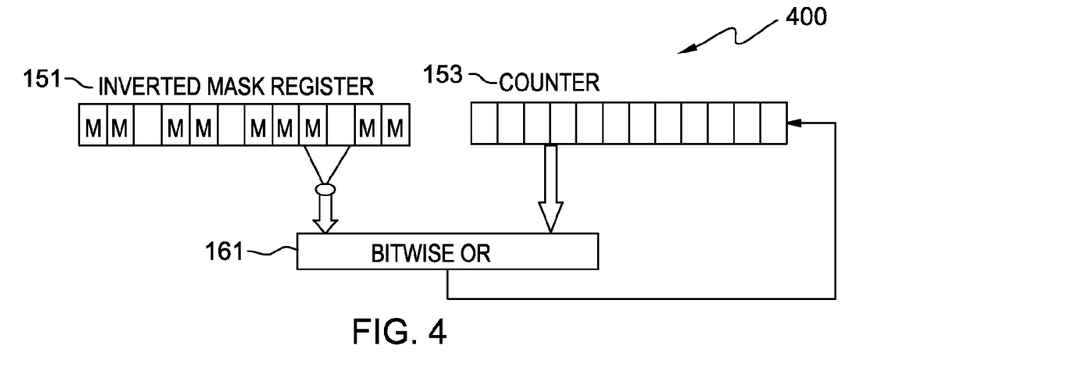
FIG. 4 illustrates a process for initializing a counter to hold timestamp overflow data, in accordance with an embodiment of the present disclosure.

FIG. 4 illustrates a process, 400, of initializing counter 153 to store timestamp overflow data such as timestamp overflow 331 and 333. Prior to the process illustrated in FIG. 4, counter 153 consists of all zeros and inverted mask register 151 contains an inverted version of a mask register such as mask register 157, shown in FIG. 6, where an inverted version comprises switching each bit of data with its opposite. In this exemplary embodiment, bits in inverted mask register 151 are denoted by "M" and correspond to bits with a value of one. Conversely, blank bits in inverted mask register 151 correspond to bits with a value of zero. Inverted mask register 151 and counter 153 are combined by bitwise OR 161. Bitwise OR 161 is a bitwise operation such that if either a bit of data in mask register 151 or its corresponding bit of data in counter 153 is a one, then the corresponding bit of data in the output will be recorded as a one. A bit in the output will only be recorded as a zero if both of its corresponding bits in the input are also zeros. In this exemplary embodiment of the present disclosure, the value of counter 153 is updated with output of bitwise OR 161.

Figure 5:
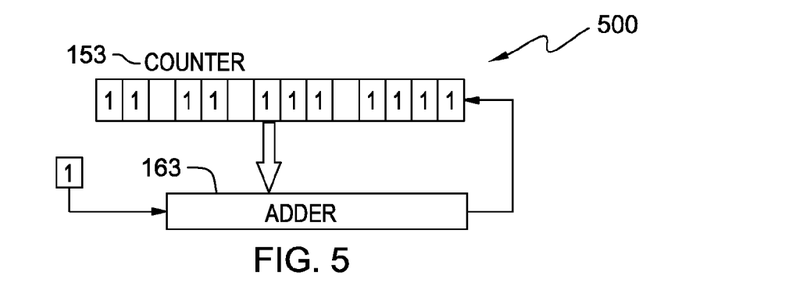
FIG. 5 illustrates a process for incrementing a counter, in accordance with an embodiment of the present disclosure.

FIG. 5 illustrates a process, 500, for incrementing a counter such as counter 153. In one embodiment of the present disclosure, a value of one is added to the overflowing timestamp data stored in counter 153. Because the data in counter 153 was previously combined with inverted mask register 151 using bitwise OR 161, the true value representing the overflowing timestamp data will be present only in the data sectors corresponding to zeros in inverted mask register 151 or ones in mask register 157. In the present embodiment, both the current value of counter 153 and a value of one are connected to an adder, such as adder 163, which adds the two values together and stores the output back into counter 153. If pattern match occurs once the counter has been incremented, then the process described in FIG. 4 is repeated before the counter is incremented again.

Figure 6:
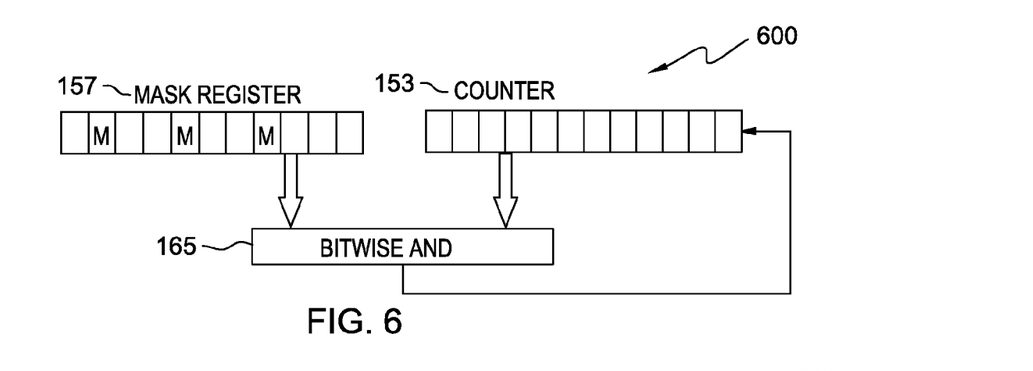
FIG. 6 illustrates a process for extracting timestamp overflow data from a counter, in accordance with an embodiment of the present disclosure.

FIG. 6 illustrates a process, 600, for extracting the timestamp overflow data from counter 153. In this exemplary embodiment, a bit, in mask register 157, that is denoted by an "M", corresponds to a bit with a value of one. Conversely, a blank bit in mask register 157 corresponds to a bit with a value of zero. By combining mask register 157 with counter 153 through a bitwise AND operation, only data which is present in free bit locations defined in the mask register are retained. Because mask register 157 only contains ones in locations corresponding to free bits in the trace data, all of the data which is output from bitwise AND 165 contains timestamp overflow data and can be used to overwrite free bits in the trace data. The value of counter 153 is updated with output of bitwise AND 165.

Figure 7:
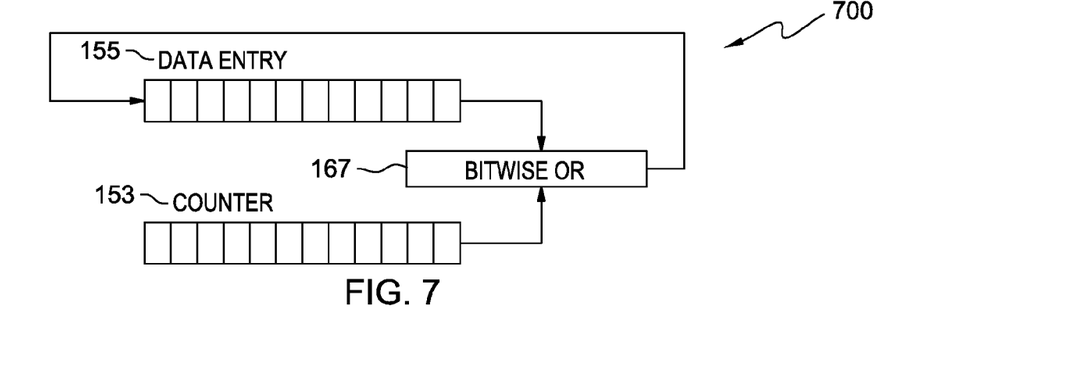
FIG. 7 illustrates a process for including timestamp overflow data in a trace entry, in accordance with an embodiment of the present disclosure.

FIG. 7 illustrates the process, 700, of inserting the timestamp overflow data from counter 153 into data entry 155. Data entry 155 can be a trace data such as trace data 311. Counter 153 contains the timestamp overflow data present only in locations corresponding to free bits in the trace data. Counter 153 and data entry 155 are combined using bitwise OR 167. In the process of combining these two elements, the free bits present in data entry 155 are overwritten with the timestamp overflow data present in counter 153.

Figure 8:
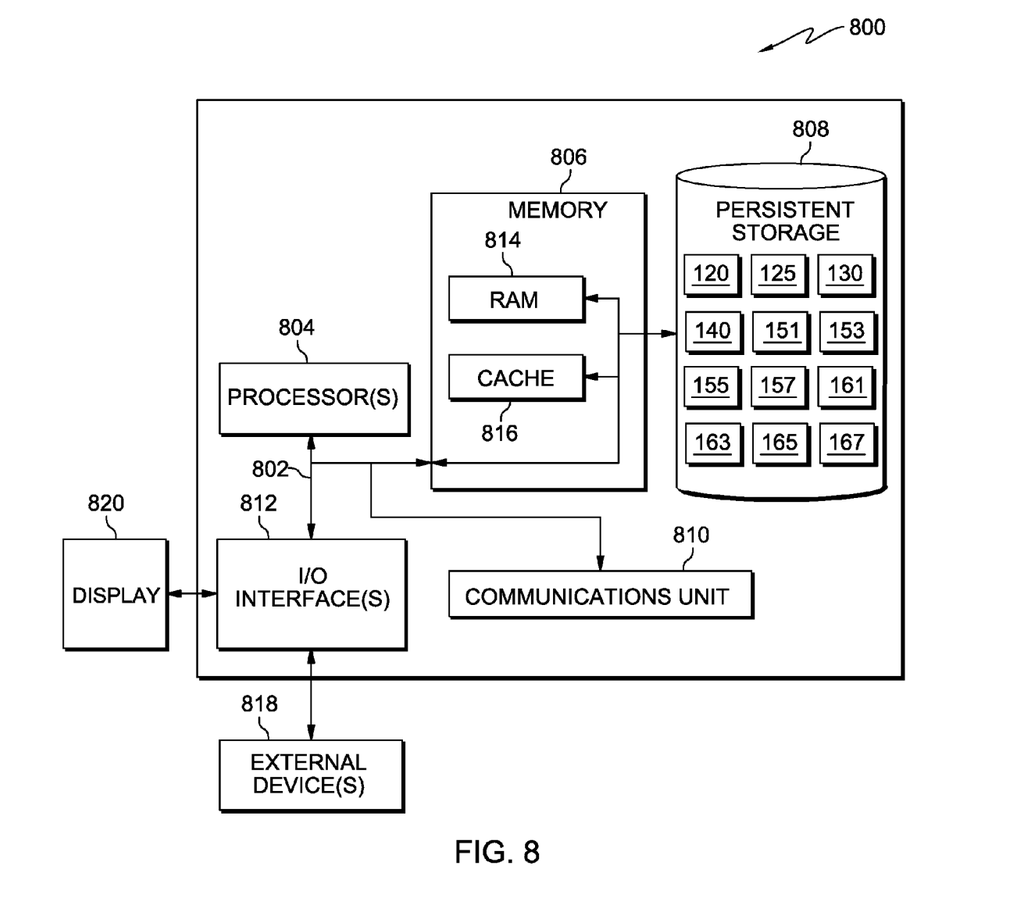
FIG. 8 depicts a block diagram of components of the computing device executing the trace array creation program, in accordance with an embodiment of the present disclosure.

FIG. 8 depicts a block diagram, 800, of components of computing device 110 in accordance with an illustrative embodiment of the present disclosure. It should be appreciated that FIG. 8 provides only an illustration of one implementation and does not imply any limitations with regard to the environments in which different embodiments may be implemented. Many modifications to the depicted environment may be made.

Computing device 110 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Trace array creation program 130 and trace requirement data 140 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of computing device 110 and network 150. In these examples, communications unit 810 includes one or more network interface cards. Communications unit 810 may provide communications through the use of either or both physical and wireless communications links. Trace array creation program 130 may be downloaded to persistent storage 808 through communications unit 810.

I/O interface(s) 812 allows for input and output of data with other devices that may be connected to computing device 110. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present disclosure, e.g., trace array creation program 130, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the present disclosure may be used in a variety of electronic applications, including but not limited to advanced sensors, memory/data storage, semiconductors, microprocessors and other applications.

A resulting integrated circuit chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from low-end applications to advanced computer products having a display, a keyboard or other input device, and a central processor.

Having described a method of increasing the efficiency of a trace array by dynamic allocation of timestamp counter for storage of trace data, which can be embodied as, or included as part of, an electronic circuit, a logic device, or an integrated circuit, it is noted that modifications and variations may be made by persons skilled in the art in light of the above teachings.

The resulting electronic circuits and integrated circuit chips (that incorporate increasing the efficiency of a trace array by dynamic allocation of timestamp counter for storage of trace data) can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the disclosure. It is therefore to be understood that changes may be made in the particular embodiments disclosed which are within the scope of the present disclosure as outlined by the appended claims.

What is claimed is:

1. A method for increasing efficiency of a trace array by dynamically allocating a timestamp counter, the method comprising:
   determining, by a processor, a timestamp of a trace entry in the trace array for a signal that is configured to indicate a number based on consecutive cycles that the signal is present on a trace bus;
   writing, by the processor, a first part of the timestamp to a memory that is allocated for the timestamp of the trace entry, wherein a second part of the timestamp is a value of overflow data of the timestamp that exceeds a maximum value that can be stored in the memory allocated for the timestamp of the trace entry; and
   overwriting, by the processor, one or more free bits of the trace entry with the second part of the timestamp, wherein the one or more free bits of the trace entry comprising one or more bits previously marked to be overwritten or one or more bits not labeled as important to trace requirements such that trace data of the trace entry is not completely overwritten, with bits labeled as important to trace requirements left intact, wherein the overwriting using logics comprising:
   combining, by the processor, an inverted mask register and a timestamp counter using a bitwise OR operation and storing an output of the bitwise OR operation from combining the inverted mask register and the timestamp counter into the timestamp counter;
   incrementing, by the processor, the value of the timestamp counter by one and storing an output of the increment into the timestamp counter;
   combining, by the processor, a mask register and the timestamp counter using a bitwise AND operation and storing an output of the bitwise AND operation from combining the mask register and the timestamp counter into the timestamp counter; and
   combining, by the processor, the timestamp counter and a data entry using a bitwise OR operation and storing an output of the bitwise OR operation from combining the timestamp counter and the data entry into the data entry.

2. The method of claim 1, the method further comprising:
   receiving, by the processor, a trace requirement data, wherein the trace requirement data specifies which signals are to-be captured and stored by the trace entry; and
   creating, by the processor, the trace entry based, at least in part, on one or more of the signals specified by the trace requirement data.

3. The method of claim 2, wherein the trace requirement data indicates of one or both of (i) signals to-be stored as part of the trace data, and (ii) signals which are not-to-be stored as part of the trace data.

4. The method of claim 1, wherein overwriting, by the processor, the free bits with the second part of the timestamp comprises:
   identifying, by the processor, sequential sections of free bits and non-sequential free bits; and
   writing, by the processor, the second part of timestamp onto the identified sequential sections of free bits and non-sequential free bits.

5. The method of claim 1, wherein the one or more free bits comprise information corresponding to signals that are not-to-be captured and stored by the trace entry.

6. The method of claim 1, the method further comprising:
recording, by the processor, the location of a free bit using a the mask register, wherein the mask register includes an array of bits with values of either zero or one corresponding to an absent or present free bit respectively.

7. A computer program product for increasing efficiency of a trace array by dynamically allocating a timestamp counter, the computer program product comprising:
one or more computer-readable storage media and program instructions stored on the one or more computer-readable storage media, the program instructions comprising:
program instructions to determine a timestamp of a trace entry in the trace array for a signal that is configured to indicate a number based on consecutive cycles that the signal is present on a trace bus;
program instructions to write a first part of the timestamp to a memory that is allocated for the timestamp of the trace entry, wherein a second part of the timestamp is a value of overflow data of the timestamp that exceeds a maximum value that can be stored in the memory allocated for the timestamp of the trace entry; and
program instructions to overwrite one or more free bits of the trace entry with the second part of the timestamp, wherein the one or more free bits of the trace entry comprising one or more bits previously marked to be overwritten or one or more bits not labeled as important to trace requirements such that trace data of the trace entry is not completely overwritten, with bits labeled as important to trace requirements left intact, wherein the overwriting using logics comprising:
program instructions to combine an inverted mask register and a timestamp counter using a bitwise OR operation and storing an output of the bitwise OR operation from combining the inverted mask register and the timestamp counter into the timestamp counter;
program instructions to increment a value of the timestamp counter by one and storing an output of the increment into the timestamp counter;
program instructions to combine a mask register and the timestamp counter using a bitwise AND operation and storing an output of the bitwise AND operation from combining the mask register and the timestamp counter into the timestamp counter; and
program instructions to combine the timestamp counter and the data entry using a bitwise OR operation and storing an output of the bitwise OR operation from combining the timestamp counter and the data entry into the data entry.

8. The computer program product of claim 7, the computer program product further comprising:
program instructions to receive a trace requirement data, wherein the trace requirement data specifies which signals are to-be captured and stored by the trace entry; and
program instructions to create the trace entry based, at least in part, on one or more of the signals specified by the trace requirement data.

9. The computer program product of claim 8, wherein the trace requirement data indicates of one or both of (i) signals to-be stored as part of the trace data, and (ii) signals which are not-to-be stored as part of the trace data.

10. The computer program product of claim 7, wherein overwriting, by the processor, the free bits with the second part of the timestamp comprises:
program instructions to identify sequential sections of free bits and non-sequential free bits; and
program instructions to write the second part of timestamp onto the identified sequential sections of free bits and non-sequential free bits.

11. The computer program product of claim 7, wherein the one or more free bits comprise information corresponding to signals that are not-to-be captured and stored by the trace entry.

12. The computer program product of claim 7, the computer program product further comprising:
program instructions to record the location of a free bit using a mask register, wherein the mask register includes an array of bits with values of either zero or one corresponding to an absent or present free bit respectively.

13. A logic device, the logic device being configured to dynamically allocate a timestamp counter, the logic device comprising:
a hardware circuit component configured to determine a timestamp of a trace entry for a signal that is configured to indicate a number based on consecutive cycles that the signal is present on a trace bus;
a hardware circuit component configured to write a first part of the timestamp to a memory that is allocated for the timestamp of the trace entry, wherein a second part of the timestamp is a value of overflow data of the timestamp that exceeds a maximum value that can be stored in the memory allocated for the timestamp of the trace entry; and
a hardware circuit component configured to overwrite one or more free bits of the trace entry with the second part of the timestamp, wherein the one or more free bits of the trace entry comprising one or more bits previously marked to be overwritten or one or more bits not labeled as important to trace requirements such that trace data of the trace entry is not completely overwritten, with bits labeled as important to trace requirements left intact, wherein the overwriting using logics comprising:
a hardware circuit component configured to combine an inverted mask register and a timestamp counter using a bitwise OR operation and storing an output of the bitwise OR operation from combining the inverted mask register and the timestamp counter into the timestamp counter;
a hardware circuit component configured to increment the value of the timestamp counter by one and storing an output of the increment into the timestamp counter;
a hardware circuit component configured to combine a mask register and the timestamp counter using a bitwise AND operation and storing an output of the bitwise AND operation from combining the mask register and the timestamp counter into the timestamp counter; and
a hardware circuit component configured to combine the timestamp counter and a data entry using a bitwise OR operation and storing an output of the bitwise AND operation from combining the mask register and the timestamp counter into the timestamp counter.

14. The logic device of claim 13, the logic device further comprising:
a hardware circuit component configured to receive a trace requirement data, wherein the trace requirement data specifies which signals are to-be captured and stored by the trace entry; and a hardware circuit component configured to create the trace entry based, at least in part, on one or more of the signals specified by the trace requirement data.

15. The logic device of claim 14, the logic device further comprising:

a hardware circuit component configured to identify, based, at least in part, on the received trace requirement data, one or both of (i) signals to-be stored as part of the trace data, and (ii) signals which are not-to-be stored as part of the trace data, wherein the one or more free bits comprise information corresponding to signals that are not-to-be-stored by the trace entry.

16. The logic device of claim 13, the logic device further comprising:

a hardware circuit component configured to identify sequential sections of free bits and non-sequential free bits; and a hardware circuit component configured to write the second part of timestamp onto the identified sequential sections of free bits and non-sequential free bits.

17. The logic device of claim 13, the logic device further comprising:

a hardware circuit component configured to record the location of a free bit using a mask register, wherein the mask register includes an array of bits with values of either zero or one corresponding to an absent or present free bit respectively.

18. The logic device of claim 13, wherein the one or more free bits comprise information corresponding to signals that are not-to-be captured and stored by the trace entry.

* * * * *